United States Patent
Yashima et al.

(10) Patent No.: US 7,901,732 B2
(45) Date of Patent: Mar. 8, 2011

(54) PRODUCTION PROCESS OF LIGHT AMOUNT ADJUSTMENT MEMBER, LIGHT AMOUNT ADJUSTMENT MEMBER, LIGHT AMOUNT ADJUSTMENT DEVICE AND PHOTOGRAPHING APPARATUS

(75) Inventors: Masataka Yashima, Tokyo (JP); Ichiro Onuki, Kanagawa (JP); Takeshi Miyazaki, Kanagawa (JP); Akio Kashiwazaki, Kanagawa (JP); Eriko Namazue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 2367 days.

(21) Appl. No.: 10/367,862

(22) Filed: Feb. 19, 2003

(65) Prior Publication Data

US 2003/0174196 A1 Sep. 18, 2003

(30) Foreign Application Priority Data

Feb. 19, 2002 (JP) .................................. 2002-041685
Feb. 19, 2002 (JP) .................................. 2002-041706

(51) Int. Cl.
*B05D 5/06* (2006.01)
(52) U.S. Cl. ........................................................ 427/164
(58) Field of Classification Search .................. 427/162, 427/164
See application file for complete search history.

(56) References Cited

U.S. PATENT DOCUMENTS

| 5,479,298 | A | | 12/1995 | Yanagi et al. | ................. | 359/888 |
|---|---|---|---|---|---|---|
| 5,585,884 | A | | 12/1996 | Onuki | ............................ | 396/51 |
| 5,725,959 | A | | 3/1998 | Terada et al. | ................. | 428/448 |
| 5,736,278 | A | * | 4/1998 | Nakazawa et al. | ................. | 430/7 |
| 5,859,955 | A | | 1/1999 | Wang | ............................ | 395/109 |
| 6,046,768 | A | | 4/2000 | Kaneda et al. | ................. | 348/208 |
| 6,162,510 | A | * | 12/2000 | Kashiwazaki et al. | ......... | 427/511 |
| 2001/0026307 | A1 | * | 10/2001 | Akahira | ........................ | 347/101 |

FOREIGN PATENT DOCUMENTS

| EP | 0 828 379 A2 | 3/1998 |
|---|---|---|
| EP | 0 976 570 A1 | 2/2000 |

(Continued)

OTHER PUBLICATIONS

Patent Abstracts of Japan, vol. 2000, No. 15, Apr. 16, 2001 (JP 2000-352736, Dec. 19, 2000).

(Continued)

*Primary Examiner* — Timothy H Meeks
*Assistant Examiner* — Elizabeth Burkhart
(74) *Attorney, Agent, or Firm* — Fitzpatrick, Cella, Harper & Scinto

(57) ABSTRACT

A production process of a light amount adjustment member, by which a cheap light amount adjustment member hating excellent optical properties can be simply produced is provided. A light amount adjustment device and a photographing apparatus which are cheap, have excellent optical properties and are equipped with the light amount adjustment member are provided by providing the simple production process of the light amount adjustment member. The production process comprises the step of relatively scanning an ink-jet head, from which an ink is ejected on a transparent base material, on the surface of which an ink-receiving layer has been formed, to the transparent base material to apply the ink to the ink-receiving layer, thereby forming a light amount adjustment region, wherein in the step of forming the light amount adjustment region, the ink is ejected from the ink-jet head in such a manner that the ink is applied to the whole light amount adjustment region.

10 Claims, 9 Drawing Sheets

FOREIGN PATENT DOCUMENTS

| | | |
|---|---|---|
| JP | 5-173004 | 7/1993 |
| JP | 6-273601 | 9/1994 |
| JP | 11-14923 | 1/1999 |
| JP | 2000-106649 | 4/2000 |
| JP | 2000-352736 | 12/2000 |

OTHER PUBLICATIONS

Patent Abstracts of Japan, vol. 2000, No. 7, Sep. 29, 2000 (JP 2000-106649, Apr. 11, 2000).

* cited by examiner d=3.8mm
DENSITY GRADIENT
PORTION
O.D.=0~1.3 d=4mm
CONSTANT DENSITY
PORTION
O.D.=1.3 d=8mm

PRODUCTION PROCESS OF LIGHT AMOUNT ADJUSTMENT MEMBER, LIGHT AMOUNT ADJUSTMENT MEMBER, LIGHT AMOUNT ADJUSTMENT DEVICE AND PHOTOGRAPHING APPARATUS

BACKGROUND OF THE INVENTION

1. Field of the Invention

The present invention relates to a light amount adjustment member, for example, a dipping filter in a light amount adjustment device used in a photographing apparatus such as a camera, an optical instrument, or the like, and particularly to a production process of a light amount adjustment member suitable for use in the production of an Neutral Density ("ND") filter whose spectral transmittance is substantially constant in a visible light region, a light amount adjustment member, and a light amount adjustment device and a photographing apparatus using the light amount adjustment member.

2. Related Background Art

Into an optical instrument such as a digital camera or video camera, a diaphragm device has heretofore been incorporated for the purpose of controlling the light quantity thereof. In this diaphragm device, it is generally conducted to control the light quantity using a diaphragm blade. However, when the diaphragm diameter becomes too small to a high-luminance subject in particular, deterioration of resolving power caused by diffraction occurs. Therefore, the diaphragm diameter is limited, and at the same time a neutral density filter (hereinafter abbreviated as "ND filter") or the like is used as a light amount adjustment member to limit the quantity of light transmitted, thereby preventing the deterioration of image quality. Specifically, an ND filter that is a separate member from a diaphragm blade is bonded to a part of the diaphragm blade with an adhesive, whereby a diaphragm opening is retained at a certain size without stopping down the diaphragm diameter to a very small diameter when the luminance of a subject is high, and the ND filter is located on an optical axis instead to limit the quantity of light transmitted. In some cases, a filter having a gradient in the light amount adjustment function thereof (hereinafter referred to as "density gradient") may be used as the ND filter to further control the light quantity by moving this filter on the optical axis. There have also been proposed various diaphragm devices constructed by letting the ND filter independently have an optical action without being installed in the diaphragm blade.

As the ND filter as the light amount adjustment member in such light amount adjustment devices as described above, a metal film or dielectric film formed by vapor deposition or the like, or a multi-layer laminate thereof is generally used. This is attributable to the fact that these materials have good optical properties and excellent durability. Other ND filters include those of the type that a dye or pigment capable of absorbing light is mixed and incorporated into glass, or cellulose acetate, PET or the like that is a material for forming a transparent film, and those of the type that a dye or pigment capable of absorbing light is applied to a transparent base material composed of the above-described material. Further, a production process of an ND film making good use of a silver halide film has also been proposed (see Japanese Patent Application Laid-Open No. 05-173004). The light amount adjustment member having a density gradient is used as a light amount adjustment device for laser beam printers or the like even when its spectral transmission properties are not constant (see Japanese Patent Application Laid-Open No. 11-14923).

SUMMARY OF THE INVENTION

However, the conventional production processes described above have involved such problems as described below. First of all, the ND filter obtained by forming the film by vapor deposition involves such a problem that its product cost becomes expensive because the scale of a production apparatus thereof becomes large, and a production process is complicated.

In the ND filters of the type that the dye or pigment is incorporated into the material for forming the film or the like, and the type that the dye or pigment is applied to the surface of the base material, it is very difficult to produce a filter having a density gradient, though an ND filter having an even density can be produced.

When the silver halide film is used, a filter having a density gradient can also be produced. However, such a process involves such a problem that light scattering is caused by silver particles remaining in the film, and so the optical properties thereof are deteriorated.

On the other hand, the investigation by the present inventors has revealed that in a light amount adjustment member produced by providing an ink-receiving layer on a transparent base material like the present invention and ejecting an ink having a light amount adjustment function by an ink-jet system on the ink-receiving layer to impart the function thereof, when such a member is produced by such a gradation recording system as conducted in general ink-jet recording, and, for example, such ink dots as illustrated in FIG. 2 are formed, the resulting member is affected by distribution of the quantity of light transmitted by the presence of the dots and diffraction at edge portions of the dots, so that blurriness may occur in an image formed in some cases.

It is therefore an object of the present invention to provide a production process of a light amount adjustment member, by which a light amount adjustment member, particularly an ND filter, having excellent optical properties, can be simply produced.

Another object of the present invention is to provide cheap light amount adjustment devices and photographing apparatus equipped with the light amount adjustment member, having excellent optical properties by providing the simple production process of the light amount adjustment member.

The above objects can be achieved by the present invention described below.

In a first aspect of the present invention, there is provided a process for producing a light amount adjustment member, which comprises the step of relatively scanning an ink-jet head, from which an ink is ejected on a transparent base material, on a surface of which an ink-receiving layer has been formed, to the transparent base material to apply the ink to the ink-receiving layer, thereby forming a light amount adjustment region, wherein in the step of forming the light amount adjustment region, the ink is ejected from the ink-jet head in such a manner that the ink is applied to the whole light amount adjustment region.

In a second aspect of the present invention, there is provided a process for producing a light amount adjustment member, which comprises the step of ejecting plural kinds of inks different in light amount adjustment function from each other from an ink-jet head, from which the inks are ejected, on a transparent base material, on the surface of which an ink-receiving layer has been formed, while relatively scanning the ink-jet head to the transparent base material, to apply the inks to the ink-receiving layer, thereby forming a light amount adjustment region, wherein in the step of forming the light amount adjustment region, the light amount adjustment region is formed by changing at least one of the kind and number of the inks ejected from the ink-jet head, application intervals (recording pitches) of the inks to the transparent base material and quantities of the inks ejected, such that the light amount adjustment function has a gradient, wherein a light transmittance of the ink having the smallest light amount adjustment function among the plural kinds of the inks used for applying the ink to the whole light amount adjustment region is at least 50%, and an ink is applied to all regions the light transmittance of which is not higher than the above light transmittance.

More specifically, the above process means that when an ink is ejected from the ink-jet head to apply the ink to the transparent base material, thereby forming the light amount adjustment region, the ink is applied so as to satisfy the relationship, $a^2+b^2<(r/2)^2$, wherein "a" denotes an interval (primary scan recording pitch) between positions for ejection in a first direction when the ink-jet head, from which the ink is ejected, and the transparent base material having the ink-receiving layer at the surface thereof are relatively scanned to apply the ink, "b" denotes an interval (secondary scan recording pitch) between positions for ejection in a second direction perpendicular to the first direction, and "r" denotes a dot diameter of each dot recorded.

In the present invention, the primary scan direction means the first direction when the ink-jet head and the transparent base material are relatively scanned and generally indicates a direction perpendicular to a direction of a nozzle row when a multi-nozzle ink-jet head is used, and the secondary scan direction indicates the direction of the nozzle row. The ink (hereinafter referred to merely as "ink") having the light amount adjustment function used in the present invention means an ink comprising a coloring material capable of absorbing light and containing various kinds of additives so as to satisfy ejection performance from the ink-jet head, as needed. The ink is applied to the whole light amount adjustment region in the above-described manner, whereby portions where any ink is not present disappear as typically shown in FIG. 3, so that a light amount adjustment member free of the influence of the diffraction or the like at the edge portions of the ink dots, which have been the problem in the above-described prior art, and having excellent optical properties can be provided.

In the present invention, it is preferred that the step of forming the light amount adjustment region has a sub step of relatively scanning the ink-jet head plural times to a prescribed region of the transparent base material to form the light amount adjustment region, and a distance between plural ink dots recorded on the transparent base material by each scanning among plural times of the scanning be greater than each ink dot diameter. Namely, a group of ink dots recorded by one scanning as the result that the ink is applied in the above-described manner do not overlap each other, and the dots are formed independently of each other. As a result, aggregation of the coloring material caused by overlapping of the ink dots applied can be prevented.

As described in the above constitution, the light transmittance when an ink having the smallest light amount adjustment function among the plural kinds of the inks is used to record the whole light amount adjustment region is at least 50%, the ink is applied to all light amount adjustment regions having a light transmittance lower than the above light transmittance, whereby portions at which boundaries between an ink dot and a transparent portion occur can be lessened as much as possible, and the density of the ink dots at the boundary portions becomes the density of the ink having the smallest light amount adjustment function as described above.

Therefore, the above-described diffraction or the like at the edge portions of the ink dots is reduced to such an extent that no problems are caused in actual use.

More specifically, processes for forming a light amount adjustment region having a gradient light amount adjustment function on the transparent base material by keeping both recording pitch and quantity of an ink ejected from the ink-jet head as substantially constant include, for example, the following process. One of the minimum units (pixels) that can be recorded in such a state that both recording pitch and quantity of the ink ejected have been kept as substantially constant, or a plurality of units composed of a plurality of pixels that exhibit different light amount adjustment function levels from each other are formed, and the levels are used to conduct multi-valued processing, thereby recording the units on the ink-receiving layer. At this time, in each unit, a concentration of a coloring material of at least one ink used upon recording in each pixel making up the unit and the number of recorded dots thereof are preset.

On the other hand, processes for forming a light amount adjustment region having a gradient light amount adjustment function by keeping the quantity of an ink ejected as substantially constant and changing the recording pitch include a process in which a maximum recording pitch, at which an ink can be applied to the whole light amount adjustment region, is regarded as a maximum pitch, and the recording pitch is gradually reduced. However, there is a limit to the maximum quantity of an ink received in the ink-receiving layer. Therefore, it is also effective to conduct recording by changing the ink used to an ink which is high in concentration of the coloring material or by temporally widening the recording pitch, as needed.

Further, processes for forming a light amount adjustment region having a gradient light amount adjustment function by keeping the recording pitch as substantially constant and changing the quantity of an ink ejected include a process in which a quantity of the ink ejected, at which the ink can be applied to the whole light amount adjustment region, is regarded as a minimum ejection quantity, and the ejection quantity is gradually increased. However, in this case also, it is effective from the viewpoint of the maximum ink receiving quantity of the ink-receiving layer like the case described above, to conduct recording by changing the ink used to an ink high in concentration of the coloring material and temporally reducing the ejection quantity.

In a further aspect of the present invention, there is provided a light amount adjustment member produced by one of the above-described production processes of a light amount adjustment member.

In a still further aspect of the present invention, there is provided a light amount adjustment device which comprises the light amount adjustment member produced by one of the above-described production processes of a light amount adjustment member and a driving means for driving the light amount adjustment member, wherein a transmission quantity of a beam passing through a prescribed opening is controlled according to the driving quantity of the light amount adjustment member. A light amount adjustment device in which control of light quantity is made by the light amount adjustment member upon the control of the light quantity, and the influence of diffraction is lessened can thereby be provided.

In a yet still further aspect of the present invention, there is provided a photographing device which comprises any of the light amount adjustment devices described above, a photographing optical system for forming a subject image, an image pickup means for photoelectrically converting the subject image formed and a recording means for recording a signal photoelectrically converted, wherein the light amount adjustment device is arranged in the photographing optical system. A photographing device in which control of light quantity is made by the light amount adjustment device upon the control of the light quantity upon photographing, where the deterioration of resolving power by diffraction is lessened, and the uniformity of an blurry image is worsened, can thereby be provided.

BRIEF DESCRIPTION OF THE DRAWINGS

FIG. 13 illustrates a spectral transmittance of the ND filter produced in EXAMPLE 4.

DESCRIPTION OF THE PREFERRED EMBODIMENTS

Figure 1:
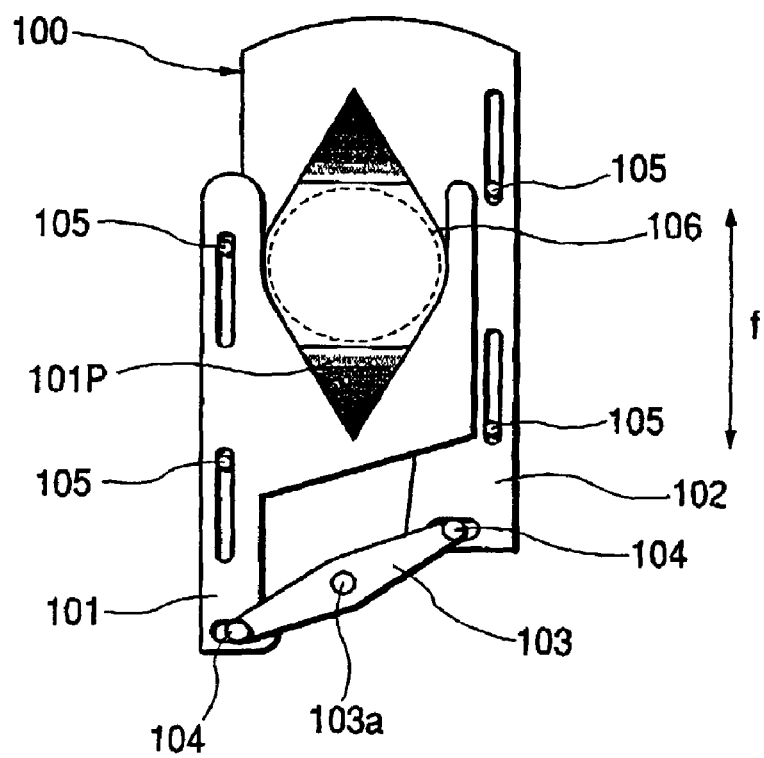
FIG. 1 illustrates a light amount adjustment device (diaphragm device) produced in EXAMPLE 2.
Figure 2:
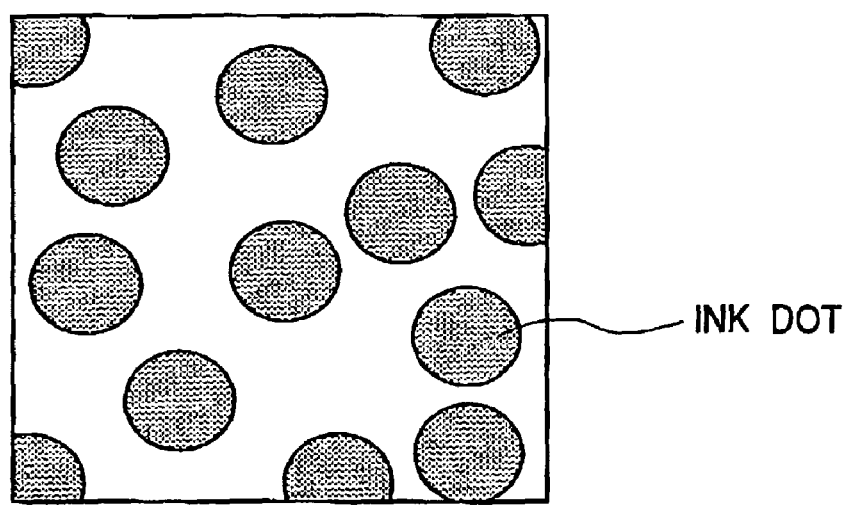
FIG. 2 illustrates a recorded state in general ink-jet recording.
Figure 3:
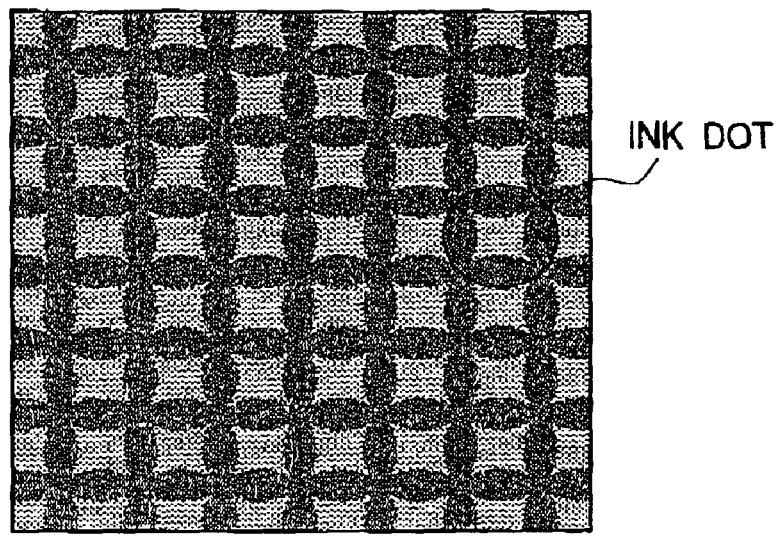
FIG. 3 illustrates a recorded state in ink-jet recording in the present invention.

The present invention will hereinafter be described in more detail by the preferred embodiments of the present invention.

A transparent base material used in the production process of a light amount adjustment member according to the present invention, on which an ink-receiving layer has been formed, will be first described. No particular limitation is imposed on the transparent base material usable in the present invention so far as it has necessary properties such as mechanical strength and optical properties in the case where it is provided as a light amount adjustment member. Examples thereof may include transparent filmy base materials composed of polyethylene terephthalate, diacetate, triacetate, cellophane, celluloid, polycarbonate, polyimide, polyvinyl chloride, polyvinylidene chloride, polyacrylate, polyethylene, polypropylene or the like. A glass base material may also be used so far as it satisfies the above-described necessary properties.

In the production process of the light amount adjustment member according to the present invention, an ink-receiving layer formed on such a transparent base material as mentioned above is used. No particular limitation is imposed on the material for receiving an ink used in this case so far as it absorbs the ink, and a coloring material in the ink can be received in the layer and fixed thereto. However, such water-soluble resins and water-dispersing resins as described below are preferably used. Examples of the water-soluble resins may include synthetic resins, such as polyvinyl alcohol and modified product of polyvinyl alcohol, such as anionically modified polyvinyl alcohol, cationically modified polyvinyl alcohol and acetal-modified polyvinyl alcohol; hydrophilic polyurethane; polyvinyl pyrrolidone and modified products of polyvinylpyrrolidone, such as vinylpyrrolidone-vinyl acetate copolymers, vinylpyrrolidone-dimethylaminoethyl methacrylate copolymers, quaternized vinylpyrrolidone-dimethylaminoethyl methacrylate copolymers and vinylpyrrolidone-methacrylamidopropyltrimethylammonium chloride copolymers; cellulosic water-soluble resins such as carboxymethyl cellulose, hydroxyethyl cellulose and hydroxypropyl cellulose, and modified products of cellulose, such as cationic hydroxyethyl cellulose; polyester, polyacrylic acid (esters), melamine resins and modified products thereof; and graft copolymers containing at least polyester and polyurethane; and natural resins such as albumin, gelatin, casein, starch, cationic starch, gum arabic and sodium alginate. An ink-receiving layer formed by using, in particular, a water-absorbing polymer such as a starch system, carboxymethyl cellulose system, polyacrylic system or poval system among these materials becomes a swell type.

Examples of the water-dispersing resins may include a large number of resins such as polyvinyl acetate, ethylene-vinyl acetate copolymers, polystyrene, styrene-(meth)acrylic ester copolymers, (meth)acrylic ester polymers, vinyl acetate-(meth)acrylic acid (ester) copolymers, poly(meth) acrylamide, (meth)acrylamide copolymers, styrene-isoprene copolymers, styrene-butadiene copolymers, styrene-propylene copolymers, poly(vinyl ether) and silicone-acrylic copolymers. It goes without saying that the present invention is not limited thereto.

A coating formulation obtained by containing alumina hydrate, amorphous silica or the like in such a resin as mentioned above is used to create pores (voids between fine particles of alumina hydrate or amorphous silica) in the resulting coating film, whereby an ink-receiving layer of the void-absorbed type that an ink is caused to be absorbed in such pores may also be provided.

In order to control coating ability and absorbing performance of the ink and improve mechanical properties, various kinds of surfactants, crosslinking agents, dye sticking agents (water-proofing agents), antifoaming agents, antioxidants, viscosity modifiers, pH adjustors, mildew-proofing agents and plasticizers, and the like may be contained in the ink-receiving layer.

The formation of the ink-receiving layer is performed, for example, in the following manner. A material such as the water-soluble resin or water-dispersing resin described above is first dissolved or dispersed in a liquid medium selected from water, alcohols, polyhydric alcohols and other proper organic solvents together with other additives as needed, thereby preparing a coating formulation The resultant coating formulation is then applied to the surface of the transparent base material by a coating process such as a roll coater, blade coater, air-knife coater, gate roll coater, bar coater, size press, spray coating, gravure coater, curtain coater or spin coating process. The coating formulation thus applied is then dried by means of, for example, a hot air drying oven, heated drum, hot plate or the like to form an ink-receiving layer.

In the present invention, both ink-receiving layers of the swell type and void-absorbed type may be used. Of these, the ink-receiving layer of the swell type is preferably used. The reason for this is that since the ink-receiving layer of the swell type is formed into a uniform structure as a whole unlike the ink-receiving layer of the void-absorbed type, it has such a feature that scattering at voids within the receptive layer is prevented, so it is easy to achieve even and good optical properties.

In the production process of the light amount adjustment member according to the present invention, an ink is ejected on the transparent base material having such an ink-receiving layer as described above while relatively scanning an ink-jet head to the transparent base material, thereby forming a light amount adjustment region. The step of forming such a light amount adjustment region will hereinafter be described.

No particular limitation is imposed on the inks used in the present invention so far as they can be ejected by an ink-jet head. Both water-based inks and oil-based inks may be used as the inks. However, the water-based inks may preferably be used from the viewpoint of ejection reliability from the ink-jet head. As a coloring material for imparting a light amount adjustment function to an ink, any of various kinds of dyes and pigments may be used. However, various kinds of metals, inorganic fine particles, organic fine particles, etc. may also be used. Incidentally, the coloring material in the present invention means a material that controls the transmittance of light within a prescribed wavelength band including visible light, ultraviolet light and infrared light. In other words, in the case where the light amount adjustment member exemplified in the present invention is produced, that giving even transmission properties over the whole visible light band is utilized as the coloring material. However, the present invention is not limited thereto. In the case where a light amount adjustment member used in, for example, a light amount adjustment device for infrared camera is formed, it is necessary to use a material transmitting only particular wavelengths in an infrared band. This material is also included in the coloring materials. Those in which absorption of light in controlling a quantity of light transmitted occurs in the interior of the material or at the surface of the material are also included in the coloring materials used in the present invention.

A liquid medium used together with the coloring material described above when the inks used in the present invention are formed, may include water and various kinds of organic solvent. As hydrophilic media, such various kinds of water-soluble organic solvents mentioned below may be used. Examples thereof include alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones and ketone alcohols such as acetone and diacetone alcohol; ethers such as tetrahydrofuran and dioxane; oxyethylene or oxypropylene copolymers such as diethylene glycol, triethylene glycol, tetraethylene glycol, dipropylene glycol, tripropylene glycol, polyethylene glycol and polypropylene glycol; alkylene glycols the alkylene group of which has 2 to 6 carbon atoms, such as ethylene glycol, propylene glycol, trimethylene glycol, triethylene glycol and 1,2,6-hexanetriol; glycerol; lower alkyl ethers such as ethylene glycol monomethyl (or monoethyl) ether, diethylene glycol monomethyl (or monoethyl) ether and triethylene glycol monomethyl (or monoethyl) ether; lower dialkyl ethers of polyhydric alcohols, such as triethylene glycol dimethyl (diethyl) ether and tetraethylene glycol dimethyl (diethyl) ether; alkanolamines such as monoethanolamine, diethanolamine and triethanolamine; sulfolane; N-methyl-2-pyrrolidone; 2-pyrrolidone; and 1,3-dimethyl-2-imidazolidinone. Such water-soluble organic solvents as described above may be used either singly or in any suitable combination thereof.

In order to provide an ink having desired physical properties, for example, various kinds of surfactants, antifoaming agents, preservatives and the like may be added to the ink used in the present invention in addition to the above-described components as needed.

In the present invention, the ink composed of such materials as described above is applied onto the base material, on which the ink-receiving layer has been formed, by means of an ink-jet method to form a desired light amount adjustment region. As a system for applying the ink at this time, an ink-jet head of the thermal type, where an electrothermal converter is provided, or of the piezo type where a piezoelectric element is provided as an energy-generating element, may be used. When the ejection quantity of an ink is required to be changed, the ink-jet head of the piezo type is preferably used because it can change the ejection quantity with relative ease. A commercially available ink-jet printer may also be used as an apparatus for applying the ink. At this time, some consideration is required because operations such as gamma compensation and color change are performed by a printer driver. Accordingly, a special printer coping with the ejection conditions of the present invention may preferably be used. As the ink-jet head, a multi-nozzle ink-jet head having plural ink ejection orifices is preferably used from the viewpoints of making the best use of the features of the present invention and improving productivity thereof.

In the present invention, it is possible to suitably control the condition of an ink ejected from such an ink-jet head as described above to form a light amount adjustment region to which an even light amount adjustment function (even density) has been imparted, or to form a light amount adjustment region to which a gradient varying a light amount adjustment function continuously or stepwise has been imparted. In particular, according to the production process of the present invention, a light amount adjustment member having a density gradient can be simply produced in the same process as in an even-density light amount adjustment member. In this respect, the production process according to the present invention is greatly different from the conventional case where a light amount adjustment member is produced by vapor deposition or the like, thus providing an advantage from the viewpoint of production.

When the ink-jet head is relatively scanned plural times to the transparent base material, on which such ink-receiving layer as described above has been formed, to eject an ink on the transparent base material to apply the ink to the ink-receiving layer, it is preferred that ink dots of a group recorded by one scanning do not overlap with each other, and that the ink dots are formed independently of each other. More specifically, when the scanning is performed plural times, the ink is applied by arranging such a mask (multi-pass recording mask) that a relative distance (interval between ink dots formed on the transparent base material in one scanning) between positions, to which the ink is applied in each scanning, is greater than a dot diameter of an ink dot formed. As a result, aggregation of the ink can be prevented.

When plural kinds of inks are used to form ink dots, it is preferred that a group of ink dots recorded by one scanning in all the kinds of inks do not overlap each other, and the ink dots are formed independently of each other. Alternatively, it is preferred that when plural kinds of inks are used to form ink dots, ink dots of a group recorded by one scanning in each kind of ink do not overlap with each other, and that the ink dots are formed independently of each other. Moreover, different kinds of inks are preferably applied to the same position.

Ideally, it is preferred that ink dots as to all the kinds of inks are formed so as not to overlap each other like the former. However, in this case, the number of multi-pass for control thereof becomes more complicated and extensive as the kinds of the inks increase According to the investigation by the present inventor, it has been confirmed that a sufficient effect is brought about even when plural kinds of inks are used, and all the kinds of inks are applied to the same position like the latter. In other words, the inks are applied to the same position, so that the aggregation of the inks can be prevented compared with the conventional case even when the amount of the inks applied is increased.

The condition of the light amount adjustment region formed by ink(s) applied to the ink-receiving layer can be desirably changed by controlling, for example, the ejection quantity and ejection positions of the ink(s) ejected from the ink-jet head, the kinds of the ink(s) used at this time, and the number of ink dots. As described above, in the present invention, the apparatus is preset in such a manner that an ink is applied to the whole light amount adjustment region when the ink is ejected in a reference ejection quantity and at a reference ejection pitch (ejection position interval) to eject at least one ink to each ejection position, whereby it is achieved to apply the ink to the whole light amount adjustment region. When an ND filter having a density gradient is produced, it is achieved by suitably controlling the kinds and number of inks ejected from the ink-jet head or the recording pitch and ejection quantity of the inks.

After the ink is applied on to the transparent base material in the above-described manner, the ink may be dried by means of a hot air drying oven, heated drum, hot plate or the like as needed. In particular, when a crosslinking agent is mixed into the material capable of absorbing the ink, it is effective to conduct such a treatment that the coating is cured by heating or light.

In the production process of the light amount adjustment member according to the present invention, it is preferred that a transparent flattening layer be additionally provided on the ink-receiving layer after the ink is applied on to the ink-receiving layer of the transparent base material in the above-described manner to form the light amount adjustment region. This flattening layer is provided for the purpose of preventing light scattering at the surface or in the interior of the ink-receiving layer. As a material used in the formation of the flattening layer, a material may preferably be used which has a little difference in refractive index compared with such a material capable of receiving the ink as described above. When a difference in refractive index between these materials is great, a scattering component in the resulting light amount adjustment member is increased by the influence of reflection or the like on an interface between the ink-receiving layer and the flattening layer.

For the above-described reasons, the material used in the flattening layer is selected from the materials mentioned above as those capable of receiving the ink. A material where adhesiveness to ink-receiving layer is good, the mechanical strength, optical properties and the like when it is formed into a flattening layer satisfy necessary performance, and which can be laminated on the ink-receiving layer may be suitably used. Examples thereof may include a large number of resins such as polyvinyl acetate, ethylene-vinyl acetate copolymers, polystyrene, styrene-(meth)acrylic ester copolymers, (meth) acrylic ester polymers, vinyl acetate-(meth)acrylic acid (ester) copolymers, poly(meth)acrylamide, (meth)acrylamide copolymers, styrene-isoprene copolymers, styrene-butadiene copolymers, styrene-propylene copolymers, poly(vinyl ether) and silicone-acrylic copolymers. It goes without saying that the present invention is not limited thereto. The formation of the flattening layer may be performed by a process such as a roll coater, blade coater, air-knife coater, gate roll coater, bar coater, size press, spray coating, gravure coater, curtain coater or spin coating process. After the film is formed in the above-described manner, the film is preferably dried by means of, for example, a hot air drying oven, heated drum, hot plate or the like to form the transparent flattening layer.

When the ink-receiving layer is of the void-absorbed type that particles of alumina or the like are contained in the ink-receiving layer, and an ink is absorbed in voids between these particles as described above, a liquid material such as silicone oil or a fatty acid ester may be filled into these voids. In this case, it is preferred that the same transparent flattening layer as in such ordinary case as described above be further formed on such an ink-receiving layer to cover it for the purpose of preventing such filled liquid material as described above from flowing off.

In the production process of the light amount adjustment member according to the present invention, an anti-reflection coating may also be additionally formed on the ink-receiving layer or transparent base material for the purpose of improving optical properties. The anti-reflection coating formed at this time is required to have excellent anti-reflection properties in a visible light band and excellent barrier properties to water and harmful gasses. In order to satisfy these requirements, a vapor deposition multi-layer film of inorganic materials with various kinds of functional films laminated on one another is suitably used. For example, the anti-reflection coatings described in Japanese Patent Application Laid-Open No. 06-273601 by the present applicant may be used to prevent occurrence of stray light by surface reflection of the filter and moreover to shut off penetration of water and harmful gasses into the coloring material to prevent deterioration of the coloring material.

In other words, as the anti-reflection coating composed of the above-described vapor deposition multi-layer film of the inorganic materials, such a film of the structure formed of undercoat layers vapor-deposited on both surfaces of the light amount adjustment member and a repeated multi-layer film deposited thereon as described below is preferably used. More specifically, as the undercoat layer a thin film having a film thickness d of 200 to 300 nm formed of a low-refractive index material having a refractive index n of 1.49 to 1.59 comprising, as a main component, silicon oxide $SiO_x$ ($2>x>1$) having good adhesiveness to the synthetic resin material forming the outermost layer of the light amount adjustment member and excellent chemical resistance and wear resistance, is preferable. The multi-layer film deposited on the undercoat layer is preferably formed by a thin film of a first layer composed of a high-refractive index material comprising, as a main component, titanium oxide $TiO_2$, zirconium oxide $ZrO_2$ or a mixture thereof, a thin film of a second layer deposited thereon and formed of a low-refractive index material comprising, as a main component, silicon oxide $SiO_x$ ($2 \geq x \geq 1$), a thin film of the third layer deposited thereon and composed of a high-refractive index material comprising, as a main component, titanium oxide $TiO_2$, zirconium oxide $ZrO_2$ or a mixture thereof, and a thin film of a forth layer deposited thereon and formed of a low-refractive index material comprising, as a main component, silicon oxide $SiO_x$ ($2 \geq x \geq 1$).

In order to suitably retain optical properties that may be affected by the optical thickness and surface roughness of the resulting light amount adjustment member, it is preferred that the liquid droplet volume and impact dot diameter of a coloring liquid applied by a liquid jet recording process be smaller because a difference in receptive layer thickness caused by a local difference in the quantity of the coloring liquid applied becomes small. For such reasons, the coloring liquid is preferably applied in such a manner that the area of one dot of the coloring liquid formed by applying the coloring liquid onto the layer amounts to at most a twentieth of the area of the light amount adjustment region, preferably at most a fiftieth of the area. It is desirable that the light amount adjustment region be equivalent to or somewhat greater than the diameter of a beam to be controlled. The diameter of the beam herein depends on optical specifications (focal length, F number, etc.) of an optical system of which the light amount adjustment device is applied. However, it is considered to be at most about 5mm.

The surface roughness (Ra) of the resulting light amount adjustment region is preferably at most 5/1, more preferably at most 1/10 of the wavelength of light the light quantity of which is to be controlled.

The specific constitution of the production process of the light amount adjustment member according to the present invention, and light amount adjustment members obtained thereby and light amount adjustment devices using such a member will hereinafter be described.

The present invention will hereinafter be described in more detail by the following Examples. Incidentally, all designations of "wt. %" as will be used in the following examples mean % by mass unless expressly noted.

EXAMPLE 1

In this example, an ND filter having an even density whose light transmittance was about 32% (optical density (OD) =0.5) was produced. A polyethylene terephthalate (PET) film having a thickness of 100 μm was first provided as a transparent base material to form an ink-receiving layer thereon in accordance with the following process. Polyvinyl alcohol (Gohsenol GM-14L, trade name, product of The Nippon Synthetic Chemical Industry Co., Ltd.) was first used to prepare, as a coating formulation, an aqueous solution containing this polyvinyl alcohol resin at a concentration of 10 parts in terms of solid content. The coating formulation thus obtained was applied on to the PET film as a transparent base material by a means of a wire bar and then dried under a condition of 100 and 5 minutes in a hot air drying oven. The thickness of the ink-receiving layer thus formed was 7 μm On the other hand, an ink having a light amount adjustment function used in this example was prepared in the following manner. In this example, water-dispersing carbon black was used as a coloring material for imparting the light amount adjustment function to prepare two water-based inks of Black Inks 1 and 2, which were different in coloring material concentration from each other and composed of the compositions shown in Table 1, respectively.

TABLE 1

| Composition of ink used in EXAMPLE 1 | | |
| --- | --- | --- |
| | Ink 1 (wt. %) | Ink 2 (wt. %) |
| Coloring material: Water-dispersing carbon black (IJX-102B, trade name, product of Cabot Co.) | 0.6 | 1.2 |
| Ethylene glycol | 5 | 5 |
| Diethylene glycol | 5 | 5 |

TABLE 1-continued

| Composition of ink used in EXAMPLE 1 | | |
| --- | --- | --- |
| | Ink 1 (wt. %) | Ink 2 (wt. %) |
| Isopropyl alcohol | 2 | 2 |
| Acetylenol EH | 1 | 1 |
| Ion-exchanged water | 86.4 | 85.8 |

An Ink-jet head (BC-50, trade name; manufactured by Canon Inc.; nozzle pitch: 1200 dpi; ejection quantity: 4.5 pl) of the thermal ink-jet type that an electrothermal converter is used as an energy-generating element, was used to produce an ink-jet recording apparatus such that the head can be scanned at a pitch of 1200 dpi in both primary and secondary directions.

The inks prepared above were charged into this recording apparatus to apply the inks onto the transparent base material, on which the ink-receiving layer had been formed, thereby forming a colored layer.

Figure 4:
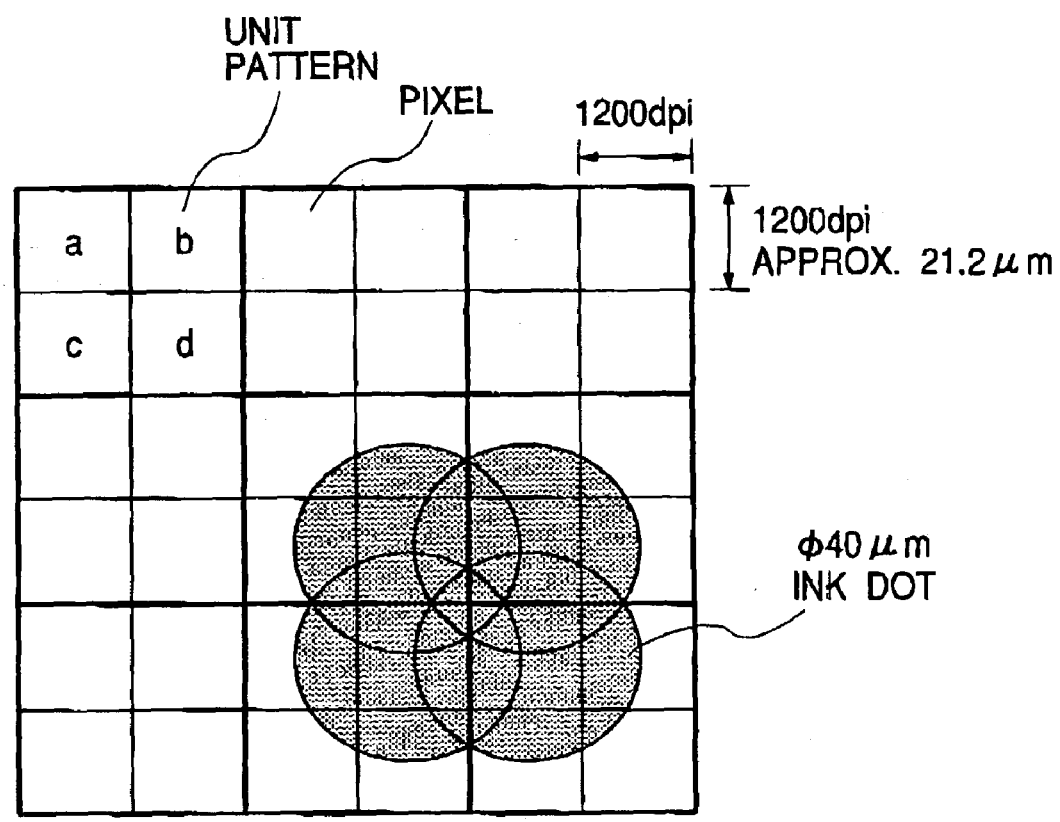
FIG. 4 illustrates units.

Specific recorded units formed in this example will hereinafter be described. In this example, a 21.17-μm (1200 dpi) square was determined to be a pixel as illustrated in FIG. 4, and four pixels (2×2) in total were determined to be a unit. One dot of Ink 1 containing the pigment at a concentration of 0.6 wt. % was applied to all positions of a, b, c and d of this unit, and one dot of Ink 2 containing the pigment at a concentration of 1.2 wt. % was additionally applied to the positions a and d making up the unit. More specifically, one dot of each of the two inks different in concentration from each other was applied to the positions a and d making up the unit, and one dot of only Ink 1 thinner in concentration was applied to the remaining positions b and c. The inks were applied in such a manner that this unit was recorded repeatedly on the whole recording region to form a pattern. Incidentally, a dot diameter on the ink-receiving layer when each ink was ejected in an amount of 4.5 pl in this example was about 40 μm, and the inks were applied to the whole light amount adjustment region as illustrated in FIG. 4 (area factor was 100%)

A transparent flattening layer was then additionally provided on the ink-receiving layer (colored layer), to which the inks had been applied, in the following manner. A toluene/ methyl ethyl ketone solution containing a styrene-butadiene copolymer (TR2000C, trade name, product of JSR K. K.) at a concentration of 10 parts in terms of solid content was prepared to provide a coating formulation. This coating formulation was then applied on to the colored layer by means of a wire bar and dried under a condition of 100° C. and 5 minutes in a hot air drying oven. The thickness of the flattening layer thus formed was 5 μm.

The optical properties of the ND filter according to this example produced in the above-described manner were evaluated in the following manner. In order to judge the quality of the ND filter that is a component in a light amount adjustment device, the transmission properties of the ND filter itself were evaluated.

A method for evaluating the transmission properties of the ND filter itself will be shown below. The ND filter produced in this example, whose density distribution pattern was uniform and light transmittance was 32%, was cut out into a size of about 5 cm×5 cm and arranged in the front of a lens of a digital camera (Power Shot G1, trade name, manufactured by Canon Inc.) to take a photograph of an ISO standard resolving power chart for an electronic still camera. As an exposure control mode, an aperture-priority AE by opening of a diaphragm was used in such a manner that a correct exposure is achieved irrespective of the presence of the ND filter. A white-black bar chart (spatial frequency at an image surface: 14.5 line pairs/mm) was cut out of the image photographed to find a difference between a level at the white portion and a level at the black portion in the image. This difference was regarded as an evaluated contrast. The ND filter was removed to conduct the same photographing work, thereby finding a difference between a level at the white portion and a level at the black portion in the image. This difference was regarded as a reference contrast.

The ratio of the evaluated contrast to the reference contrast was found from the values thus obtained, and this ratio was determined as filter contrast. The acceptable lower limit value of the filter contrast varies according to uses of a photographing apparatus and a price region. However, it is generally known that the value is preferably at least 0.9 for photographing apparatus of the popularization class and at least 0.92 for photographing apparatus of the high class. On the other hand, the filter contrast in this example was 0.94. From this fact, it was understood that the ND filter can be satisfactorily used.

EXAMPLE 2

Figure 5:
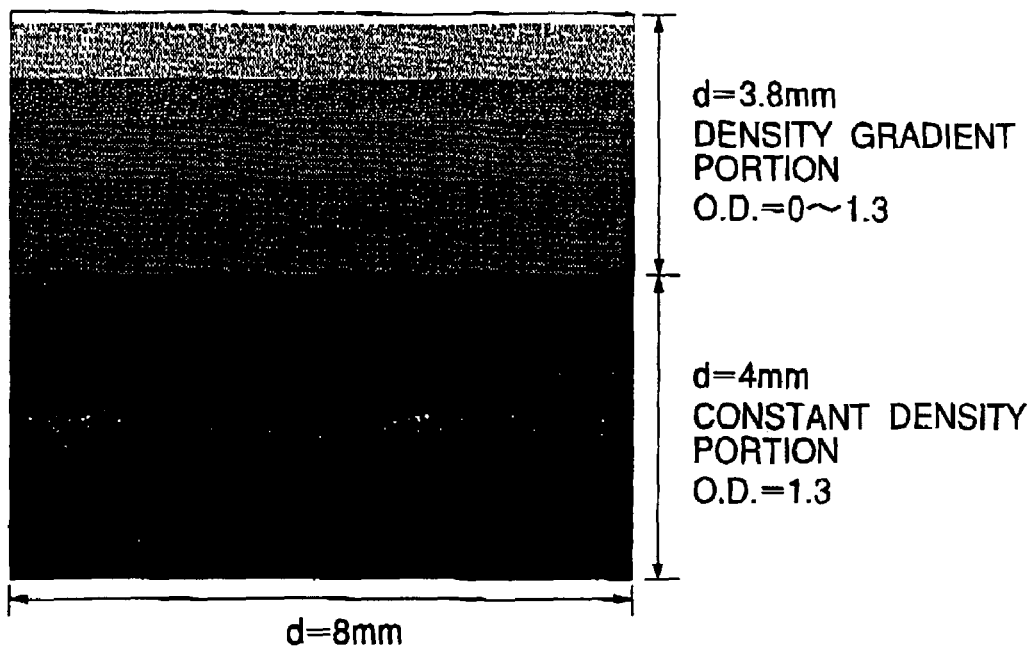
FIG. 5 illustrates an ND filter produced in EXAMPLE 2.

In this example, an ND filter having a density gradient of about 100 to 5% (OD=0 to 1.3) in terms of light transmittance as typically illustrated in FIG. 5 was produced. In this example, the ND filter was produced in the same manner as in EXAMPLE 1 except for inks used in forming the light amount adjustment region by the ink-jet recording apparatus and a recording method thereof. This example will hereinafter be described attaching importance to respects different from EXAMPLE 1.

An ink-receiving layer was first formed on PET as a transparent base material by using polyvinyl alcohol as a forming material in the same manner as in EXAMPLE 1. The step of applying inks to this ink-receiving layer was subsequent to this step. In this example also, the same recording apparatus as that used in EXAMPLE 1 was used, and both recording pitch and ink ejection quantity were kept at substantially constant. A unit was also determined to be four pixels (2×2 pixels; 1200 dpi). However, the inks used at this time were six Inks 1 to 6 respectively having different coloring material concentrations shown in Table 2. As shown in Table 2, a mixture of dyes was used as the coloring material in this example. The dye mixture used was that obtained by mixing such four dyes as shown in Table 3 at a mixing ratio shown in Table 3 in order to achieve a substantially flat spectral transmittance in a visible light range.

TABLE 2

Composition of ink used in EXAMPLE 2 (unit: wt %)

| | Ink 1 | Ink 2 | Ink 3 | Ink 4 | Ink 5 | Ink 6 |
|---|---|---|---|---|---|---|
| Coloring material: Dye mixture (see Table 3) | 0.1 | 0.2 | 0.4 | 0.8 | 1.6 | 3.2 |
| Ethylene glycol | 5 | 5 | 5 | 5 | 5 | 5 |
| Diethylene glycol | 5 | 5 | 5 | 5 | 5 | 5 |
| Isoproply alcohol | 2 | 2 | 2 | 2 | 2 | 2 |
| Acethylenol EH | 1 | 1 | 1 | 1 | 1 | 1 |
| Ion-exchanged water | 86.9 | 86.8 | 86.6 | 86.2 | 85.4 | 83.8 |

TABLE 3

Mixing ratio of coloring materials in ink used in EXAMPLE 2

| Kind of dye | | Mixing ratio |
|---|---|---|
| Black dye | PJFBK2 | 7 |
| Yellow dye | Yellow 1G | 2 |
| Magenta dye | PJFM2 | 9 |
| Cyan dye | PJFC2 | 12 |

These six inks 1 to 6 respectively having different coloring material concentrations were used to set eleven units shown in Table 4, and the concentration levels of the respective units were utilized to conduct multi-valued processing. In this example, error diffusion processing was utilized to conduct the multi-valued processing. However, the present invention is not particularly limited to the error diffusion processing, and the Dither method or the like may also be widely used.

TABLE 4

Kinds of units and concentration levels thereof

| | Position in unit | | | | Concentration |
|---|---|---|---|---|---|
| Unit | a | b | c | d | level (OD) |
| 0 | — | — | — | — | 0.00 |
| 1 | Ink 1 | Ink 1 | Ink 1 | Ink 1 | 0.06 |
| 2 | Ink 1, Ink 2 | Ink 1 | Ink 1 | Ink 1, Ink 2 | 0.13 |
| 3 | Ink 1, Ink 2 | Ink 2 | Ink 2 | Ink 1, Ink 2 | 0.16 |
| 4 | Ink 2, Ink 3 | Ink 2 | Ink 2 | Ink 2, Ink 3 | 0.25 |
| 5 | Ink 2, Ink 3 | Ink 3 | Ink 3 | Ink 2, Ink 3 | 0.30 |
| 6 | Ink 3, Ink 4 | Ink 3 | Ink 3 | Ink 3, Ink 4 | 0.48 |
| 7 | Ink 3, Ink 4 | Ink 4 | Ink 4 | Ink 3, Ink 4 | 0.58 |
| 8 | Ink 4, Ink 5 | Ink 4 | Ink 4 | Ink 4, Ink 5 | 0.91 |
| 9 | Ink 4, Ink 5 | Ink 5 | Ink 5 | Ink 4, Ink 5 | 1.11 |
| 10 | Ink 3, Ink 5 | Ink 6 | Ink 6 | Ink 3, Ink 5 | 1.33 |

The respective Inks 1 to 6 were applied to a PET film in accordance with the distributions of the units obtained from this result to form a light amount adjustment region (colored layer). A transparent flattening layer 112 composed of the styrene-butadiene copolymer was additionally formed on the colored layer in the same manner as in EXAMPLE 1. In this example, an anti-reflection coating was further formed on both surfaces of the light amount adjustment member (see FIG. 8B) to produce an ND filter having a concentration gradient. As the anti-reflection coating 113, an anti-reflection coating was formed, composed of a vapor-deposition multi-layer film of organic materials in the same manner as described in Japanese Patent Application Laid-Open No. 06-273601. This anti-reflection coating is composed of a multi-layer film of an undercoat layer vapor-deposited on each surface and a multi-layer film deposited thereon, which is a repeated multi-layer film. More specifically, the undercoat layer is a thin film having a film thickness of about 300 nm formed of a low-refractive index material having a refractive index n of about 1.5 comprising, as a main component, silicon oxide $SiO_x$ ($2 \geq x \geq 1$) having good adhesiveness to the surface and excellent chemical resistance and wear resistance. The multi-layer film laminated on the undercoat layer is formed of a thin film of a first layer composed of a high-refractive index material comprising, as a main component, a mixture of titanium oxide $TiO_2$ and zirconium oxide $ZrO2$, a thin film of a second layer deposited thereon and composed of a low-refractive index material comprising, as a main component, silicon oxide $SiO_x$ ($2 \geq x \geq 1$), a thin film of a third layer deposited thereon and composed of a high-refractive index material comprising, as a main component, a mixture of titanium oxide $TiO_2$ and zirconium oxide $ZrO_2$, and a thin film of a forth layer deposited thereon and composed of a low-refractive index material comprising, as a main component, silicon oxide $SiO_x$ ($2 \geq x \geq 1$).

The optical properties of the ND filter according to this example thus produced were evaluated in the following manner. In order to make a comparison with the evaluated result as to the ND filter having an even density in EXAMPLE 1 in the evaluation, an even-density portion having a light transmittance of about 32% was prepared, and this portion was evaluated in the same manner as in EXAMPLE 1. Namely, an even-density portion having a light transmittance of about 32% of the ND filter produced in this example was cut out into a size of about 5 cm×5 cm and arranged in the front of a lens of a digital camera (Power Shot G1, trade name, manufactured by Canon Inc.) to take a photograph of an ISO standard resolving power chart for an electronic still camera. As an exposure control mode, an aperture-priority AE by opening of diaphragm like EXAMPLE 1 was used in such a manner that a correct exposure is achieved irrespective of the presence of the ND filter. A white-black bar chart (spatial frequency at an image surface: 14.5 line pairs/mm) was cut out of the image photographed to find a difference between a level at the white portion and a level at the black portion in the image. This difference was regarded as an evaluated contrast. Reference contrast was found from a photographed image obtained upon removal of the ND filter, and filter contrast was found from these values.

Figure 6:
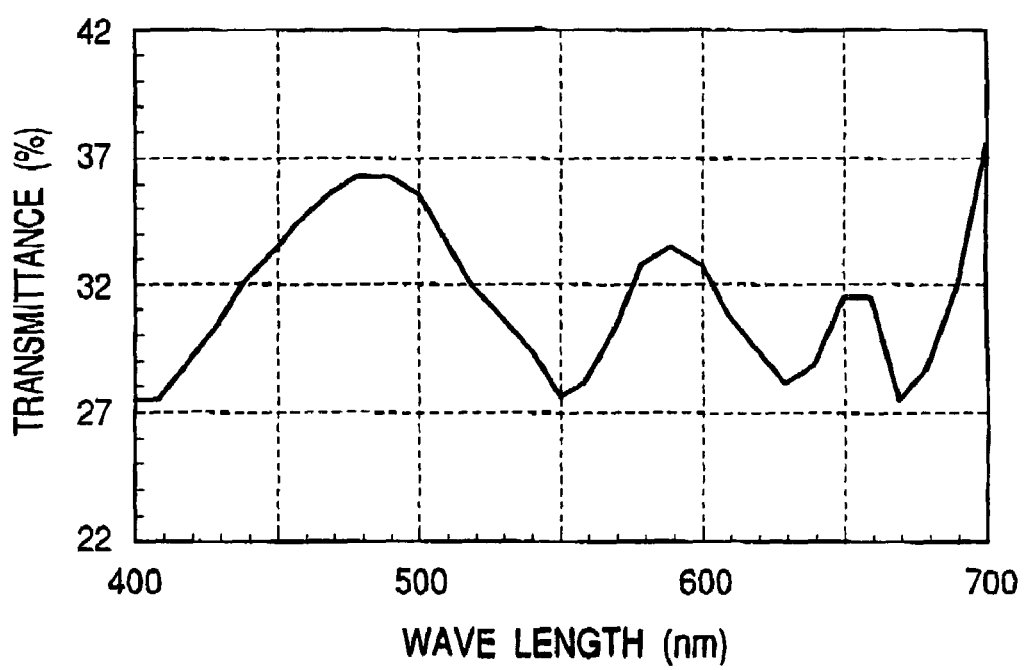
FIG. 6 illustrates a spectral transmittance of the ND filter produced in EXAMPLE 2.

The filter contrast in the ND filter obtained in this example was 0.97, and so good results were yielded. The spectral transmittance of the ND filter in this example is illustrated in FIG. 6. As illustrated in FIG. 6, it substantially satisfied the allowable limit value and central value ±5% though some transmittance fluctuation occurred. When transmission properties on the longer wavelengths are required, it can be achieved by using a near infrared-absorbing pigment or the like as a coloring material.

Figure 7:
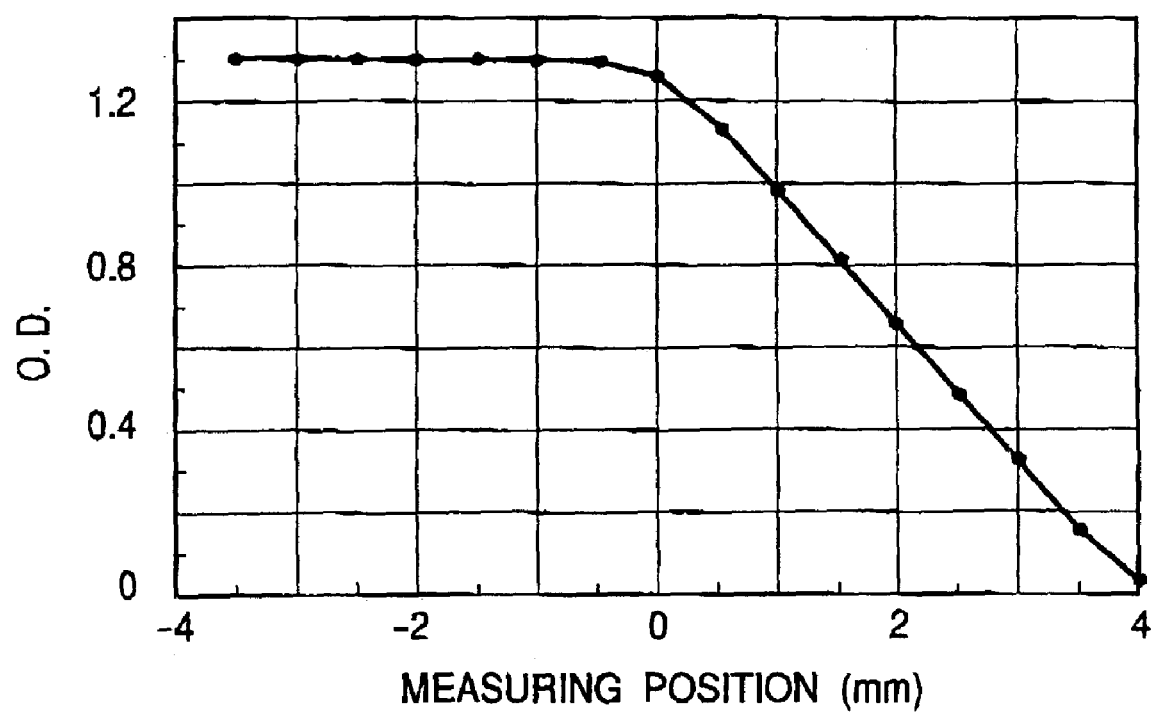
FIG. 7 illustrates an optical density distribution of the ND filter produced in EXAMPLE 2.

The state of the density gradient in the ND filter obtained in this example was determined by measuring the density at a pitch of 0.5 nm using a transmission densitometer (TR-310, trade name, manufactured by X-Rite) of an effective measuring diameter of 1 mm. The result thereof is shown in FIG. 7. As shown in FIG. 7, a smooth density gradient was confirmed though there was such a drawback that the measuring diameter was too great compared with the density change. It could be further confirmed that the ND filter obtained in this example shuts off the penetration of water and harmful gasses into the coloring material to prevent the deterioration of the coloring material.

Figure 8A:
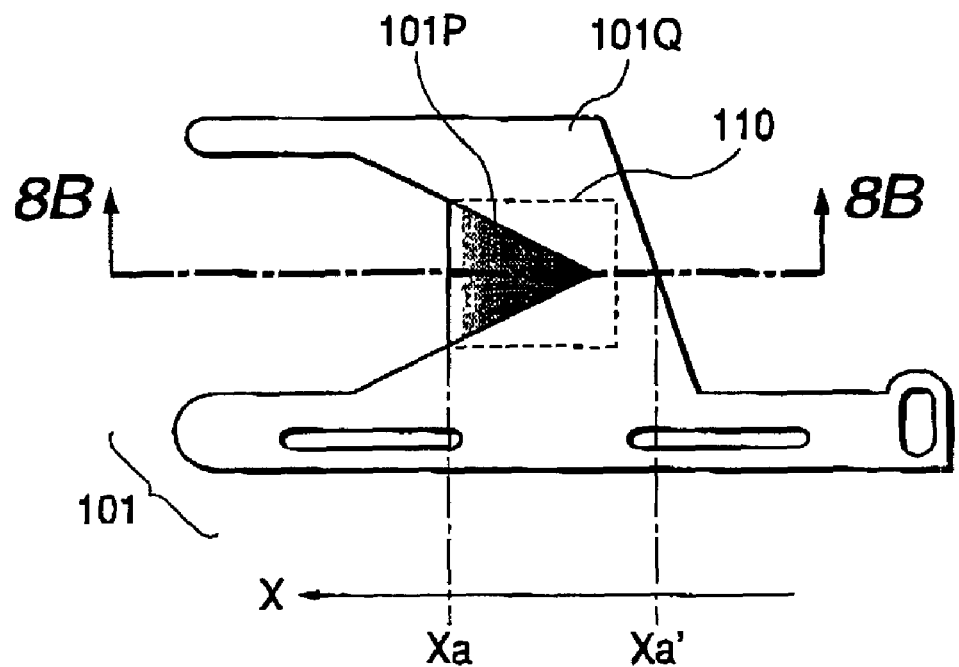
FIGS. 8A and BB illustrate a diaphragm blade of the light amount adjustment device produced in EXAMPLE 2.
Figure 8B:
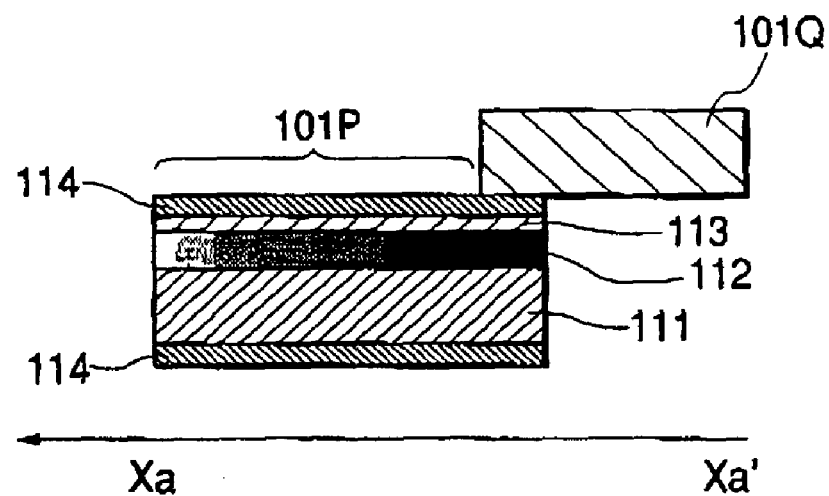

The ND filter obtained in this example was used to produce a diaphragm device that is a light amount adjustment device for video camera. FIGS. 8A and 8B illustrate a diaphragm blade that is a member of the diaphragm device. FIG. 8A is a top view of the diaphragm blade, and FIG. 1B is a cross-sectional view taken along the line 8B-8B in FIG. 8A. Reference numerical 101 indicates a diaphragm blade, and reference numeral 110 denotes the ND filter incorporated into the diaphragm blade. Reference character 101Q indicates a light interrupting member for interrupting light, and a portion indicated by 101P is a part for controlling a light quantity in the ND filter incorporated into the light interrupting member 101Q.

FIG. 1 illustrates a light amount adjustment device using the diaphragm blade. Reference numeral 101 is the first diaphragm blade shown in FIGS. 8A and 8B, and reference numeral 102 is the second diaphragm blade. Reference numeral 103 indicates a diaphragm blade-driving lever that is fitted on a shaft of a motor (not illustrated) at a hole 103a and turned on the hole 103a. The first diaphragm blade 101 and second diaphragm blade 102 are engaged at respective slots with projected pins 104 provided at both ends of the diaphragm blade driving lever 103. Reference numeral 105 indicates a guide pin for a bottom plate (not illustrated) that is relatively slideably engaged with respective grooves at side edges of the first and second diaphragm blades 101 and 102, and reference numeral 106 indicates an optical path hole provided through the bottom plate. FIG. 1 illustrates a state that the diaphragm has been fully opened. When the diaphragm is closed from the fully opened state, the optical path hole 106 that is an opening of the diaphragm is shut off by reduction of the opening areas of the first and second diaphragm blades and the portion 101P of the ND filter having a density gradient, so that the transmittance of a beam passing through the optical path 106 can be gradually reduced, and a sufficient extinguishing effect can be achieved without extremely reducing the opening area.

Figure 9:
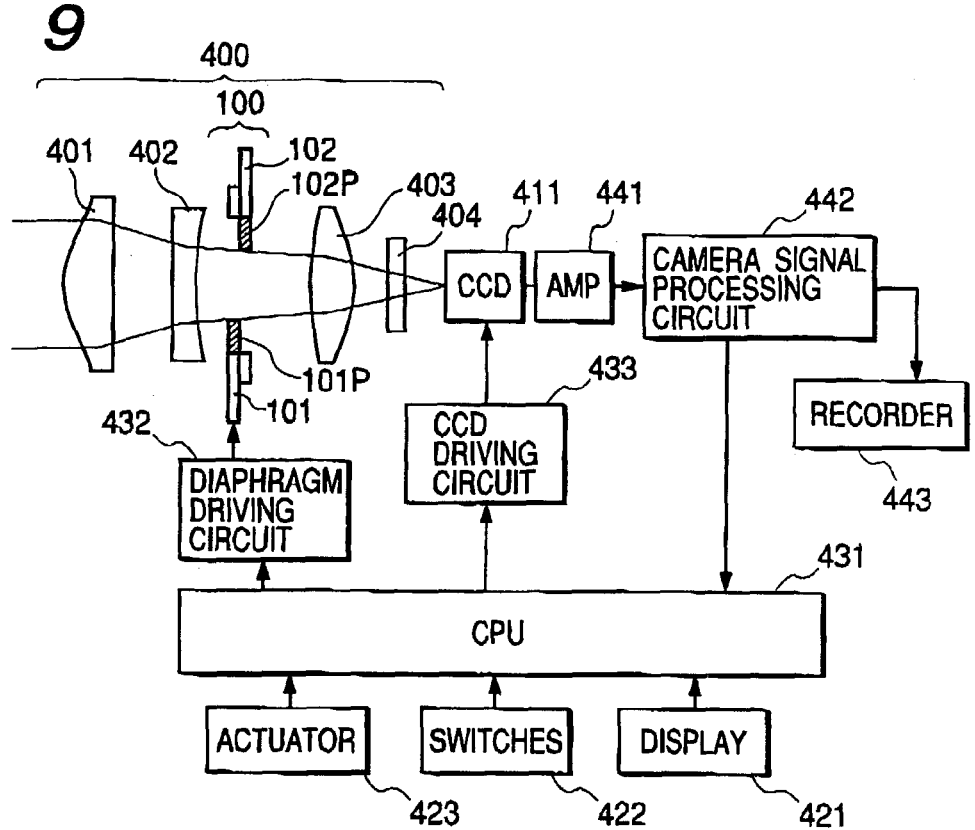
FIG. 9 illustrates the construction of a photographing apparatus in which the light amount adjustment device produced in EXAMPLE 2 has been incorporated.

FIG. 9 illustrates an example where the diaphragm device shown in FIG. 1 has been arranged into an optical device. In this example, the optical device is a digital camera (photographing apparatus), in which a motion picture image or still picture image is photoelectrically converted into an electrical signal by a image pickup means, and this signal is stored as digital data, as an example. Reference numeral 400 indicates a photographing optical system composed of a plurality of lens groups that is constructed by a first lens group 401, a second lens group 402, a third lens group 403 and the diaphragm device 100 illustrated in FIG. 1. The first lens group 401 is a fixed front lens group, the second lens group 402 is a variator lens group, the third lens group 403 is a focusing lens group, and reference numeral 404 indicates an optical low-pass filter.

An image pickup means 411 is arranged at a focal position (predetermined image-forming surface) in the photographing optical system 400. As this means, a photoelectrically converting means is used, such as a two-dimensional CCD composed of a plurality of photoelectric converter parts in which irradiation light energy is converted into electric charge, an electric charge-storing part that stores the electric charge and an electric charge-transferring part the electric charge is transferred and sent to the outside. The image pickup means 411 is driven by an image pickup means-driving circuit 433. Reference numeral 421 indicates a display device such as a liquid crystal display, which displays a subject image taken by the image pickup means 411, and operation conditions of the optical apparatus.

Reference numeral 422 indicates a group of operation switches composed of a zooming switch, a photographing set up switch, a photographing start switch and a photographing condition switch that presets a shutter speed or the like.

Reference numeral 423 indicates an actuator by which focusing drive is conducted to control a focusing condition of the photographing optical system 400, and other members are driven. CPU 431 calculates whether the degree of an average density taken in coincides with a numerical value corresponding to a correct exposure stored therein or not. When a difference occurs, a diaphragm opening is changed according to an absolute value between the difference and an absolute character, or the electric charge storing time to the image pickup means 411 is changed. When the diaphragm is operated, the diaphragm blade-driving lever 103 is turned on the hole 103a by a diaphragm driving circuit 432, thereby vertically sliding the diaphragm blades 101 and 102. Thereby, the size of the optical path hole 106 that is an opening is changed.

The diaphragm opening area or electric charge storing time is changed in such a manner, whereby the correct exposure can be achieved. The subject image formed at the correct exposure on the image pickup means 411 is converted into an electric signal as a charged quantity for every pixel according to the intensity of the brightness thereof and amplified in an amplifying circuit 441 and then subjected to processing such as a prescribed Y compensation in a camera signal processing circuit 442. Incidentally, this processing may be conducted by digital signal processing after A/D conversion. A video signal produced in such a manner is stored in a recorder 443.

The diaphragm device making use of the ND filter produced in this example was arranged in the optical apparatus of such construction as described above to form an image. As a result, a good image free of the influence of diffraction could be recorded.

EXAMPLE 3

Figure 10:
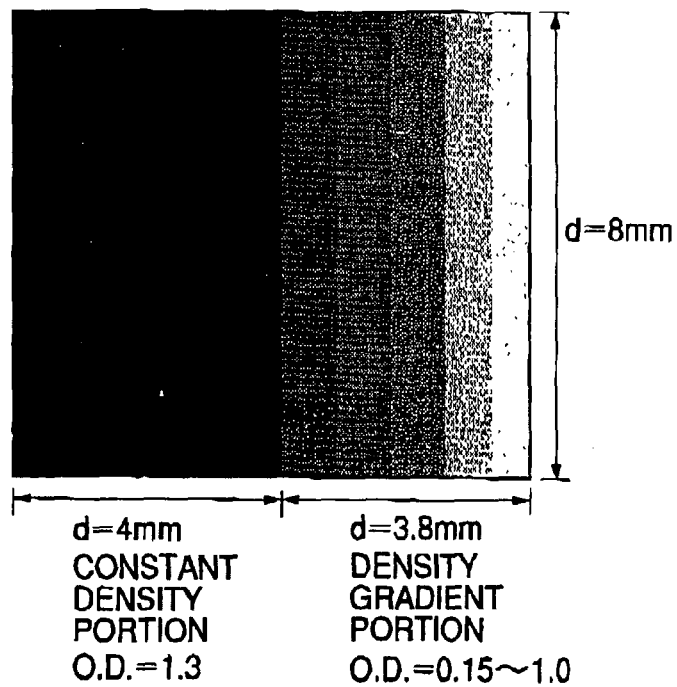
FIG. 10 illustrates an ND filter produced in EXAMPLE 3.

In this embodiment, such an ND filter as illustrated in FIG. 10, whose light transmittance varies from about 70% to about 5% stepwise, was produced. The values of the respective density steps were OD=0.15, 0.3, 0.5, 0.75, 1.0 and 1.3 in order, beginning with the thinnest. A width of each step was about 0.76 mm. The inks used in this example were inks of the same dyes (see Table 3) as those used in EXAMPLE 2 and the same compositions as the inks described in Table 2 except that the contents (coloring material concentrations) of the dye mixtures were changed to the coloring material concentrations shown in Table 5, and the changes by these coloring material concentrations were controlled by contents of ion-exchanged water. This example was different from EXAMPLE 2 in the use of a commercially available OHP sheet as the transparent base material and ink-receiving layer, the method for forming the transparent flattening layer, and the method for applying the inks. This example will hereinafter be described attaching importance to these respects.

A commercially available OHP sheet (CF-301, trade name, product of Canon Inc.) was used as a transparent base material and an ink-receiving layer for the ND filter. A transparent base material making up this OHP sheet was PET, and the ink-receiving layer was of the void-absorbed type using alumina hydrate. The inks of the same dyes as those used in EXAMPLE 2 were applied to the ink-receiving layer by using an ink-jet head (BC-50, trade name; manufactured by Canon Inc.; nozzle pitch: 1200 dpi; ejection quantity: 4.5 pl) of the thermal ink-jet type that an electrothermal converter is used, and changing the primary scanning pitch of the head from about 31.0 μm to about 10.6 μm. Incidentally, the secondary scanning pitch was fixed at 1200 dpi (about 21.2 μm).

The primary scan recording pitches in the respective optical densities and the coloring material concentrations in the inks used are shown in Table 5.

TABLE 5

Primary scanning pitch and concentration of ink used

| Density step value (OD) | Primary scanning pitch (μm) | Coloring material concentration (wt. %) |
|---|---|---|
| 0.15 | 31.0 | 0.7 |
| 0.30 | 15.4 | 0.7 |
| 0.50 | 28.0 | 2.3 |
| 0.75 | 18.6 | 2.3 |
| 1.00 | 14.0 | 2.3 |
| 1.30 | 10.6 | 2.3 |

After the inks were applied in the above-described manner, the inks were dried under a condition of 90° C. and 5 minutes in a hot air drying oven to facilitate the evaporation of water, solvents, etc. in the inks. A transparent flattening layer was then formed. In this embodiment, silicone oil was first filled into the receptive layer of the void-absorbed type, and a transparent film composed of the same styrene-butadiene copolymer as that used in EXAMPLE 1 was then formed to provide the transparent flattening layer. An ND filter of this example having density steps varied stepwise was produced in such a manner.

The optical properties of the ND filter of this example thus produced were evaluated. In this example also, in order to make comparison with the evaluated result shown in EXAMPLE 1 in the evaluation, an even-density portion having a light. transmittance of about 32% was prepared, and this portion was evaluated in the same manner as in EXAMPLE 1. As a result, the filter contrast in this example was 0.94, and so good results were yielded.

EXAMPLE 4

In this example, an ND filter having an even density whose light transmittance was about 32% (OD=0.5) was produced. The transparent base material and ink-receiving layer were produced in the same manner as in EXAMPLE 1

An ink having a light amount adjustment function used in this example was prepared. The ink used in this example was an ink using the same dye mixture (see Table 3) as that used in EXAMPLE 2 and having the composition shown in Table 6.

TABLE 6

Composition of ink used in EXAMPLE 4

| Component | Content (wt. %) |
|---|---|
| Coloring material: Dye mixture (see Table 3) | 0.85 |
| Etylene glycol | 5 |
| Diethylene glycol | 5 |
| Isopropyl alcohol | 2 |
| Acethylenol EH | 1 |
| Ion-exchanged water | 86.15 |

An ink-jet head (BC-50, trade name; manufactured by Canon Inc.; nozzle pitch: 1200 dpi; ejection quantity: 4.5 pl) of the thermal ink-jet type that an electrothermal converter is used as an energy-generating element, was used to produce an ink-jet recording apparatus where the head can be scanned at a pitch of 1200 dpi (about 21.2 μm) in both primary and secondary directions. The ink prepared above was charged into this recording apparatus to apply the ink on to the transparent base material, on which the ink-receiving layer had been formed, thereby forming a colored layer. In this example, a 21.2-μm square was determined to be a pixel, and one dot of the ink having a dye concentration of 0.85 wt.% and a composition shown in Table 6 was applied to all pixels. At this time, the dot diameter on the ink-receiving layer was about 40 μm.

Figure 11:
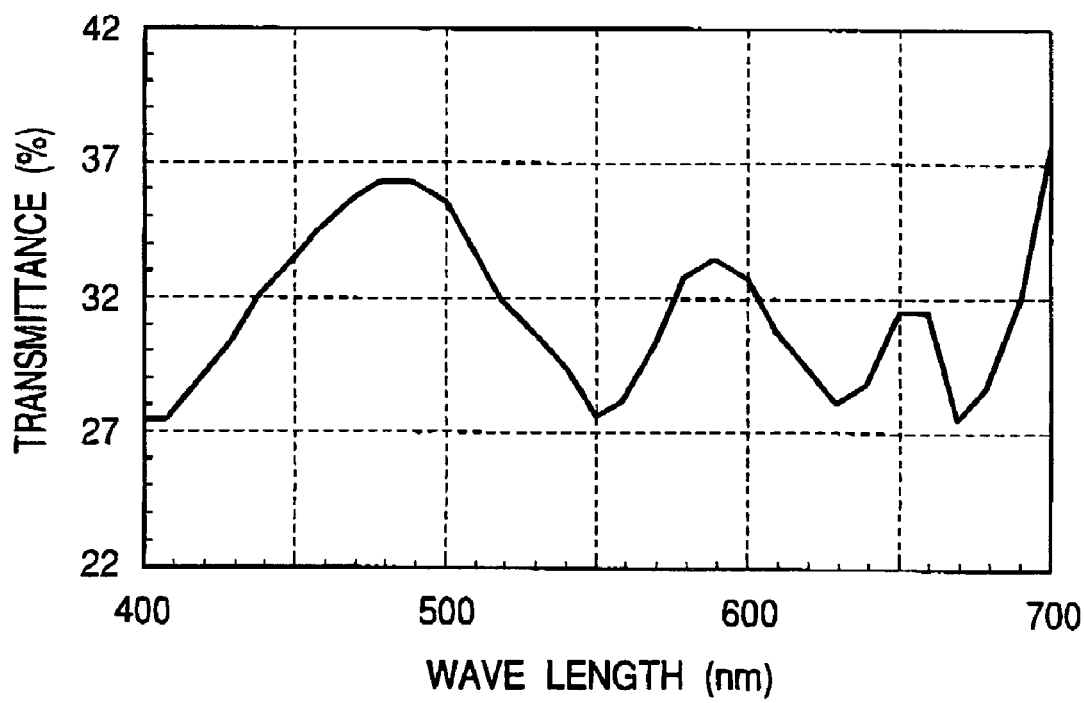
FIG. 11 illustrates a 16-pass mask used in EXAMPLE 4.

An application process of the ink performed in this example will hereinafter be described specifically. In this example, the so-called 16-pass recording, in which the recording was completed by 16 scanning operations as to one pixel region, was conducted. FIG. 11 illustrates a mask used when positions to which recording was conducted by one scanning of the ink-jet head in this example were selected. A portion indicated by a solid line is a mask portion for forming one pixel region. This mask size is a size of 4×4, and numerals in the drawing indicate the order recorded by the scanning. In this example, such mask portions are arranged repeatedly to provide a mask as illustrated in FIG. 11. This mask was arranged to correspond to positions (pixels) actually recorded, and the ink was applied in this state. In other words, a distance between places to which the ink was applied by one scanning when the scanning was performed 16 times is separate by a distance corresponding to four pixels (21.2×4=84.8 μm) in each scanning (see portions of the first scanning in FIG. 11). This value is sufficiently greater than the dot diameter (about 40 μm) formed.

Figure 12:
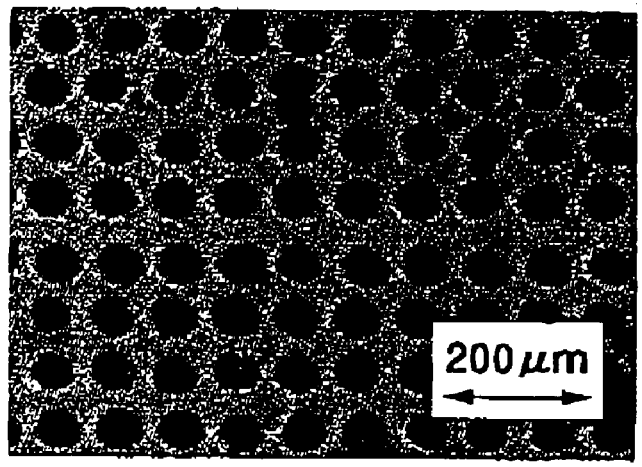
FIG. 12 is a copy of a photograph of ink dots formed by one scanning in EXAMPLE 4.
Figure 14:
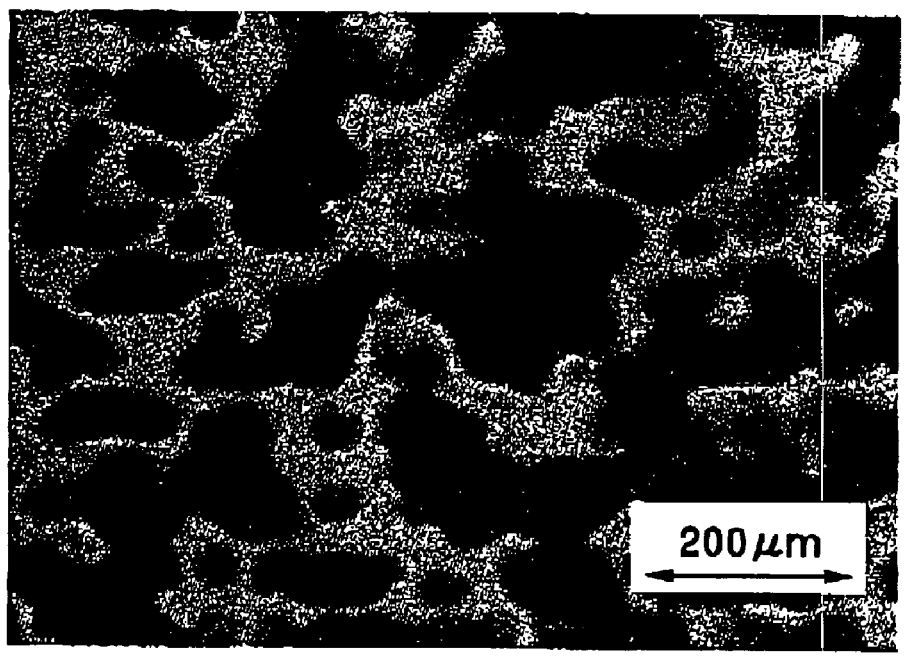
FIG. 14 is an exemplary copy of a photograph of ink dots formed by one scanning in the conventional process.

A copy image of a photograph of ink dots recorded by the first scanning is shown in FIG. 12. As shown in FIG. 12, it was confirmed that the respective dots are formed in an independent state without overlapping any other dot. A copy image of a photograph of ink dots recorded by the first scanning in the conventional process was shown in FIG. 14 for the sake of comparison.

In this example, recording or scanning was successively performed repeatedly in the above-described manner to complete the step of applying the ink. The ND filter was produced in such a manner, whereby it was confirmed that an even colored layer free of aggregation of the coloring material was formed. On the other hand, the aggregation of the coloring material occurred, and the resultant colored layer was irregular when the conventional process was performed.

A transparent flattening layer was provided on the receptive layer (colored layer), to which the ink had been applied, in the same manner as in EXAMPLE 1.

The optical properties of the ND filter of this example thus produced were evaluated in the same manner as in EXAMPLE 1. As a result, the filter contrast in this example was 0.95, and so good results were yielded.

A spectral transmittance of the ND filter produced in this example was shown in FIG. 13. The allowable limit value of the spectral transmittance when used in a photographing apparatus such as a camera is generally said to be a central value ±5% in the whole visible light range (400 to 700 nm). Therefore, the above results substantially satisfied the allowable limit value and central value ±5% though some transmittance fluctuation occurred. When transmission properties on the longer wavelengths are required, it can be achieved by using a near infrared-absorbing pigment or the like as a coloring material.

EXAMPLE 5

In this example, an ND filter having a density gradient of about 100 to 5% (OD=0 to 1.3) in terms of light transmittance as illustrated in FIG. 5 was produced. In this example, the ND filter was produced in substantially the same procedure as in EXAMPLE 4. This example will hereinafter be described attaching importance to respects different from EXAMPLE 4.

An ink-receiving layer composed of polyvinyl alcohol was first formed on PET as a transparent base material in the same manner as in EXAMPLE 4. Inks were then applied to this ink-receiving layer to form a light amount adjustment region (colored layer). At this time, the same recording apparatus as that used in EXAMPLE 4 was used, and four pixels (2×2 pixels; 1200 dpi) were determined to be a unit. This unit was recorded repeatedly, thereby controlling the coloring material quantity of each ink. However, the inks used were six inks respectively having different coloring material concentrations shown in Table 7. In this example, as with EXAMPLE 4, the same dye mixture (see Table 3) as that used in EXAMPLE 2 was used as a coloring material.

TABLE 7

Composition of ink used in EXAMPLE 5 (unit: wt %)

|  | Ink 1 | Ink 2 | Ink 3 | Ink 4 | Ink 5 | Ink 6 |
|---|---|---|---|---|---|---|
| Coloring material: Dye mixture (see Table 3) | 0.1 | 0.2 | 0.4 | 0.8 | 1.6 | 3.2 |
| Etylene glycol | 5 | 5 | 5 | 5 | 5 | 5 |
| Diethylene glycol | 5 | 5 | 5 | 5 | 5 | 5 |
| Isoproply alcohol | 2 | 2 | 2 | 2 | 2 | 2 |
| Acetylenol EH | 1 | 1 | 1 | 1 | 1 | 1 |
| Ion-exchanged water | 86.9 | 86.8 | 86.6 | 86.2 | 85.4 | 83.8 |

These six inks were used to set ten units shown in Table 8. Characters a, b, c and d in Table 8 indicate positions in such a unit as shown in FIG. 4. The concentration levels of the respective units were utilized to conduct multi-valued processing. In this example, error diffusion processing was utilized to conduct the multi-valued processing. However, the present invention is not particularly limited to the error diffusion processing, and the Dither method or the like may also be widely used.

TABLE 8

Kinds of units and concentration levels thereof

| Unit | Position in unit | | | | Concentration level (OD) |
|---|---|---|---|---|---|
|  | a | b | c | d |  |
| 0 | — | — | — | — | 0.00 |
| 1 | Ink 1 | Ink 1 | Ink 1 | Ink 1 | 0.06 |
| 2 | Ink 1, Ink 2 | Ink 1 | Ink 1 | Ink 1, Ink 2 | 0.13 |
| 3 | Ink 1, Ink 2 | Ink 2 | Ink 2 | Ink 1, Ink 2 | 0.16 |
| 4 | Ink 2, Ink 3 | Ink 2 | Ink 2 | Ink 2, Ink 3 | 0.25 |
| 5 | Ink 2, Ink 3 | Ink 3 | Ink 3 | Ink 2, Ink 3 | 0.30 |
| 6 | Ink 3, Ink 4 | Ink 3 | Ink 3 | Ink 3, Ink 4 | 0.48 |
| 7 | Ink 3, Ink 4 | Ink 4 | Ink 4 | Ink 3, Ink 4 | 0.58 |
| 8 | Ink 4, Ink 5 | Ink 4 | Ink 4 | Ink 4, Ink 5 | 0.91 |
| 9 | Ink 4, Ink 5 | Ink 5 | Ink 5 | Ink 4, Ink 5 | 1.11 |
| 10 | Ink 3, Ink 5 | Ink 6 | Ink 6 | Ink 3, Ink 5 | 1.33 |

Figures 15, 16:
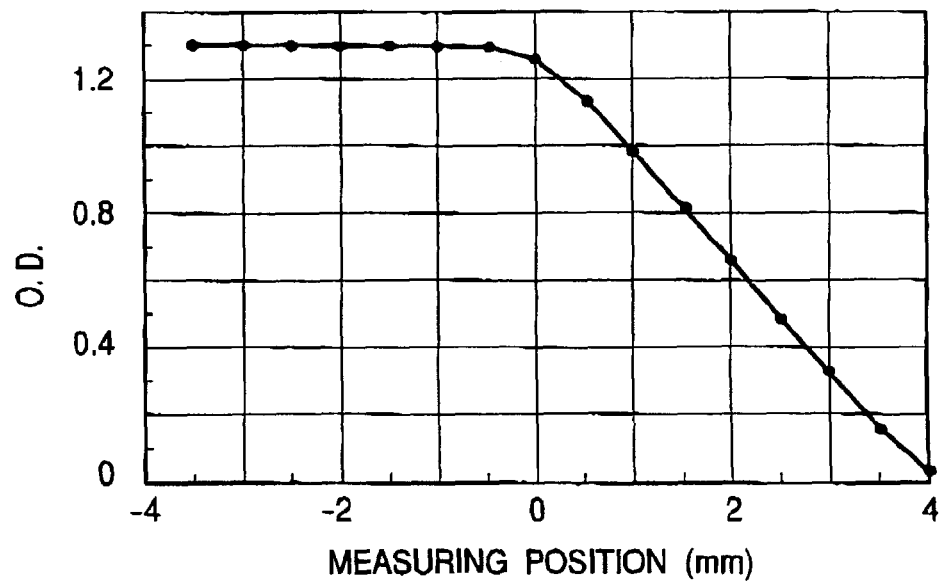
FIG. 15 illustrates a 16-pass mask used in EXAMPLE 5 .
FIG. 16 illustrates an optical density distribution of the ND filter produced in EXAMPLE 5.

The respective inks then came to be applied in accordance with the distributions of the units obtained from the result of the multi-valued processing. In this example, a 16-pass mask that scanning is performed in such order as shown in FIG. 15 was used to apply the inks in such a manner that the same kinds of inks do not overlap each other in scanning a time. The same mask was used as to all the six inks. In this example, control was made in such a manner that recording is conducted at the same positions in the same scanning as to different kinds of inks.

After the inks were applied in the above-described manner, a transparent flattening layer composed of the styrene-butadiene copolymer was formed in the same manner as in EXAMPLE 1 to produce the ND filter having a density gradient.

The optical properties of the ND filter according to this example thus produced were evaluated in the following manner. In order to make comparison with the evaluated result as to the ND filter having an even density in EXAMPLE 1 in the evaluation, an even-density portion having a light transmittance of about 32% was prepared, and this portion was evaluated in the same manner as in EXAMPLE 1. As a result, the filter contrast in this example was 0.97, and so very good results were yielded. The spectral transmittance of the ND filter in this example also substantially satisfied the allowable limit value and central value ±5% like the case of EXAMPLE 4 though some transmittance fluctuation occurred. When transmission properties on the longer wavelengths are required, it can be achieved by using a near infrared-absorbing pigment or the like as a coloring material.

The state of the density gradient in the ND filter in this example was determined by measuring the density at a pitch of 0.5 mm using a transmission densitometer (TR-310, trade name, manufactured by X-Rite) of an effective measuring diameter of 1 mm. The result thereof is shown in FIG. 16. As shown in FIG. 16, a smooth density gradient was confirmed though there was such a drawback that the measuring diameter was too great compared with the density change.

The ND filter obtained in this example was used to produce a diaphragm device as a light amount adjustment device for video camera in the same manner as that produced in EXAMPLE 2. As a result, a good image having little influence from diffraction could be recorded when the diaphragm device making use of the ND filter produced in this example is arranged in an optical apparatus in the same manner as in EXAMPLE 2.

As described above, according to the present invention, there are provided the production processes of the light amount adjustment member, by which a light amount adjustment member excellent in optical properties can be cheaply produced with good yield by a very simple operation. According to the present invention, there can also be provided the production processes of the light amount adjustment member, by which a light amount adjustment member having a density distribution varying continuously or stepwise that has been markedly difficult to achieve by other production methods, and excellent optical properties can be simply produced.

What is claimed is:

1. A process for producing a light amount adjustment member, which comprises the step of ejecting plural kinds of inks different in light amount adjustment function from each other from an ink-jet head, from which the inks are ejected, onto a transparent base material, on the surface of which an ink-receiving layer has been formed, while scanning the ink-jet head relative to the transparent base material, to apply the inks to the ink-receiving layer, thereby forming a light amount adjustment region,
wherein during the scanning, the light amount adjustment region is formed by changing at least one of (i) the kind and number of the inks ejected from the ink-jet head, (ii) application intervals of ejecting the inks onto the transparent base material, and (iii) quantities of the inks ejected, such that the light amount adjustment function has a gradient,
wherein a light transmittance when the ink having the smallest light amount adjustment function among the plural kinds of the inks is applied to the whole light amount adjustment region is at least 50%, and
wherein, in a case of forming an area of the light amount adjustment region having a light transmittance equal to or lower than the light transmittance when the ink having the smallest light amount adjustment function among the plural kinds of the inks is applied to the whole light amount adjustment region, an ink selected from the plural kinds of inks an ink is applied to the entirety of the area.

2. The production process according to claim 1, wherein the step of forming the light amount adjustment region has
i) a sub step of conducting recording while keeping the quantity of the ink ejected from the ink-jet head and application intervals (recording pitches) of the inks to the transparent base material at substantially constant, and
ii) a sub step of forming plural units different in light quantity control level from each other, which are composed of one or plural pixels of the smallest unit (pixel) that can be recorded in the sub step i), thereby recording the units on the ink-receiving layer in accordance with a result of a multi-valued processing performed with the levels, and wherein in the plural units, the kind and the number of recorded dots of at least one ink applied to each pixel making up each unit are set.

3. The production process according to claim 1, wherein the step of forming the light amount adjustment region has a sub step of relatively scanning the ink-jet head plural times to a prescribed region of the transparent base material to form the light amount adjustment region, and wherein
a distance on the transparent base material between plural ink dots recorded by each scanning among plural times of the scanning is greater than each ink dot diameter.

4. The production process according to claim 1, wherein the step of forming the light amount adjustment region has a sub step of relatively scanning the ink-jet head plural times to a prescribed region of the transparent base material to form the light amount adjustment region, and wherein
plural kinds of inks different in light amount adjustment function from each other are used as the ink, and a distance on the transparent base material between plural ink dots applied by each scanning as to all the kinds of inks is greater than each ink dot diameter.

5. The production process according to claim 1, wherein the step of forming the light amount adjustment region has a sub step of relatively scanning the ink-jet head plural times to a prescribed region of the transparent base material to form the light amount adjustment region, and wherein
plural kinds of inks having a light amount adjustment function are used as the ink, a distance on the transparent base material between plural ink dots applied by each scanning as to each ink is greater than each ink dot diameter, and the positions applied by the plural kinds of inks are the same.

6. The production process according to claim 1, wherein taking a maximum recording pitch, at which the ink can be applied to the whole light amount adjustment region, to be a maximum pitch, a light amount adjustment function having a gradient is imparted by making the recording pitch smaller than the maximum pitch.

7. The production process according to claim 1, wherein taking a minimum ejection quantity, in which the ink can be applied to the whole light amount adjustment region, to be a minimum ejection quantity, a light amount adjustment function having a gradient is imparted by making the ejection quantity greater than the minimum ejection quantity.

8. The production process according to claim 1, which further comprises the step of forming a flattening layer on the ink-receiving layer to which the ink has been applied.

9. The production process according to claim 1, wherein the spectral transmission properties of the ink having a light amount adjustment function are substantially constant in a visible light range.

10. The production process according to claim 1, wherein the ink applied to the entirety of the area is an ink having the smallest light amount adjustment function.

* * * * *